United States Patent [19]

Studer

[11] 3,937,497
[45] Feb. 10, 1976

[54] DRAIN JOINTING SYSTEM

[76] Inventor: Altee C. Studer, 9818 Hawley Road, El Cajon, Calif. 92020

[22] Filed: May 15, 1974

[21] Appl. No.: 470,128

[52] U.S. Cl. .............. 285/111; 285/161; 285/351
[51] Int. Cl.² ................................ F16L 17/02
[58] Field of Search ............ 285/111, 110, 348, 56, 285/42, 57, 43, 58, 44, 59, 351, 60, 158, 161; 4/190, 145, 146, 288, 292

[56] References Cited
UNITED STATES PATENTS

| | | | |
|---|---|---|---|
| 2,497,441 | 2/1950 | Detweiler | 285/348 |
| 2,565,923 | 8/1951 | Hrdlilka | 285/110 X |
| 2,626,674 | 1/1953 | Boosey | 285/42 X |
| 3,700,381 | 10/1972 | Decke | 4/288 |

FOREIGN PATENTS OR APPLICATIONS

| | | | |
|---|---|---|---|
| 628,321 | 10/1961 | Canada | 285/111 |
| 276,884 | 12/1969 | Austria | 285/110 |
| 6713728 | 4/1969 | Netherlands | 285/110 |
| 1,288,994 | 2/1969 | Germany | 285/110 |

*Primary Examiner*—Dave W. Arola

[57] ABSTRACT

A composite seal for joining a down flow drain pipe to a shower pan has a drain fitting provided with a tapered rim overlying the shower pan and a packing nut for holding it in place. A flanged lower portion of the fitting forms an annular pocket around the drain pipe in which a series of three rings are stacked. The center ring has normally diverging annular sections which are forced together between the pipe and the flanged portion of the fitting thereby to seal the assembly.

5 Claims, 4 Drawing Figures

U.S. Patent  Feb. 10, 1976  3,937,497
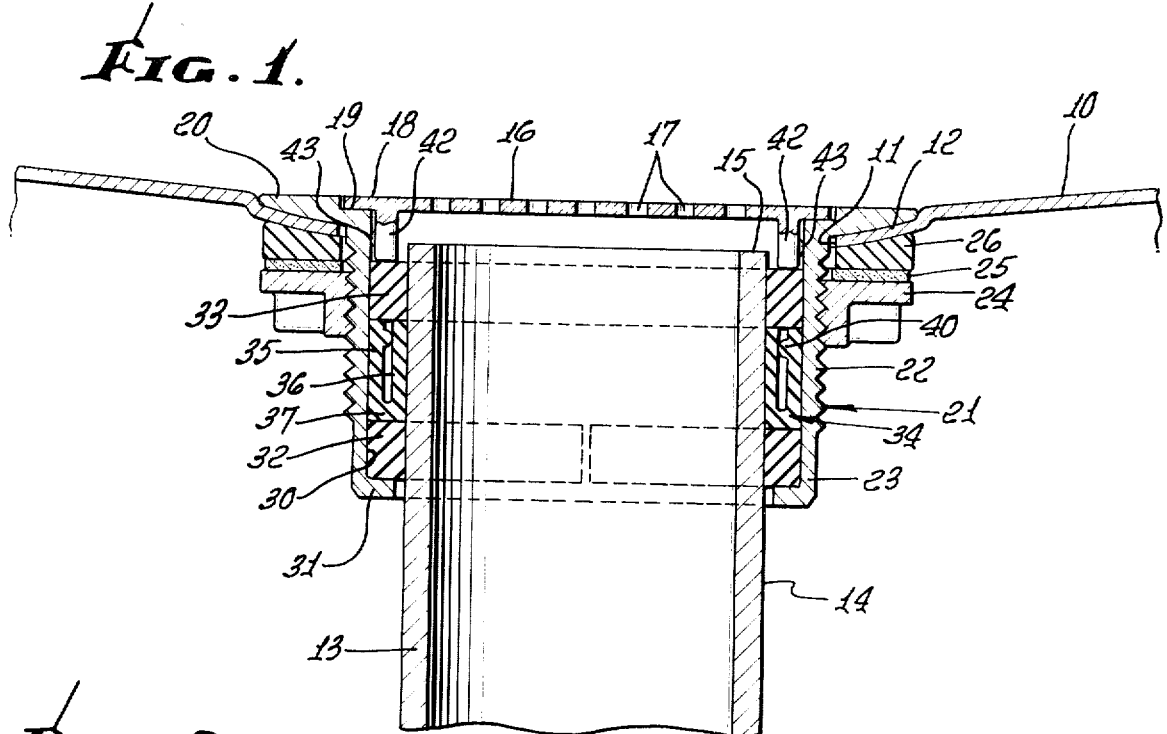
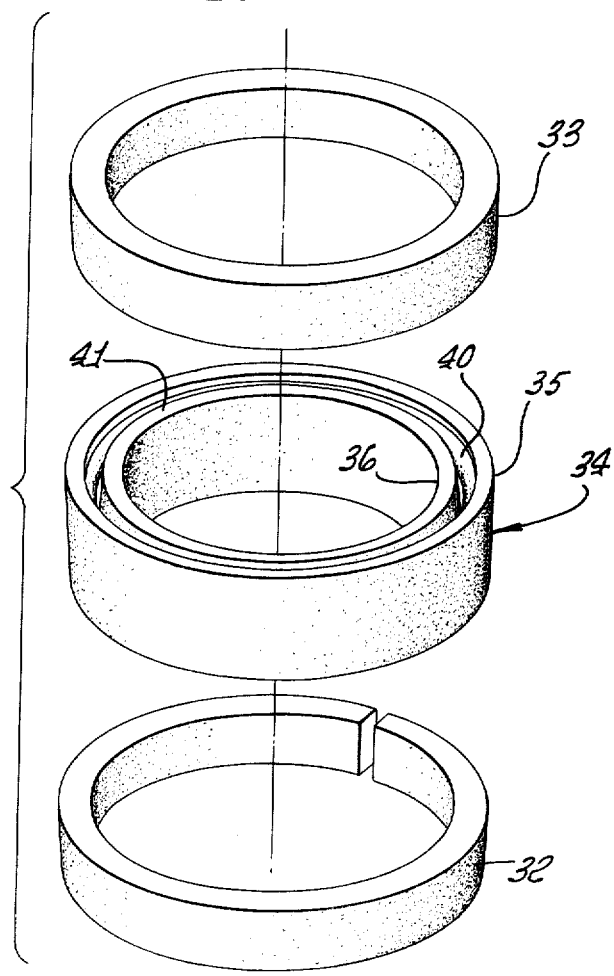
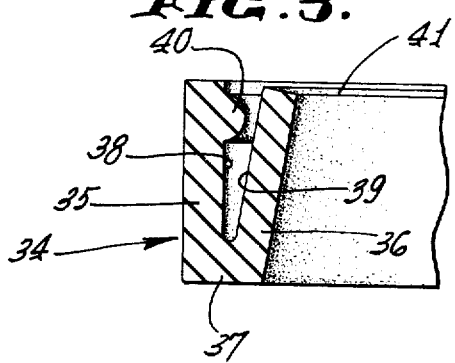
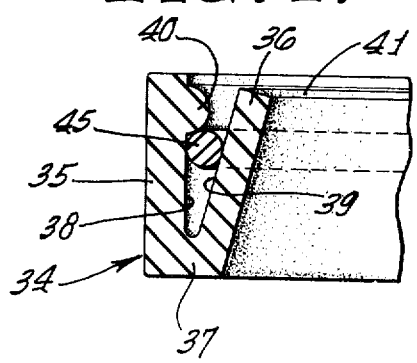

DRAIN JOINTING SYSTEM

Various conventional expedients have heretofore been made use of for sealing the joint between the drain hole of a shower pan or bathtub and the drain pipe. Lead joints have been employed as also has been conventional packing. On some occasions resort has been had to resilient packing rings in the hope of being able to make up a satisfactory seal joint with greater ease and rapidity.

For the most part, objection to conventional sealing techniques has arisen by reason of the amount of time consumed in making the joint. Since plumbing time has much to do with the cost of an installation, seals and sealing techniques which require considerable expenditure of time are objectionable. Dependability of the joint is an additional necessity which means not only that the joint must provide a tight seal initially, but that the seal must continue to be tight over long periods of use.

Further still, prior art joints which when made of lead become semi-permanent, have their drawbacks when it becomes necessary to service the installation.

Lack of regularity in the outside diameter of commercial drain pipes makes it difficult to provide a dependable joint with conventional seals and especially those making use of preformed rings.

It is therefore among the objects of the invention to provide a new and improved drain jointing system which makes use of preformed rings of such character that they can be quickly and easily slipped into place whereby to form a dependable seal.

Another object of the invention is to provide a new and improved drain joint system wherein the preformed rings which make up the sealing portion of the joint are of such character that they can be used with drain pipe, the exterior diameter of which may vary somewhat, while at the same time providing a dependable joint.

Still another object of the invention is to provide a new and improved drain jointing system making use of preformed rings for effecting the seal which are simple and dependable in use and of such character that not only can the cost of sealing rings be kept to a relative minimum but also the cost of installation can be substantially minimized.

Still another object of the invention is to provide a new and improved drain jointing system which, although when made up forms a firm, tight and dependable seal, is of such character that should it ever become necessary to unmake the joint, disconnection is a quick and easy operation, leaving all parts intact for ready remaking when that becomes necessary.

Still further included among the objects of the invention is to provide a new and improved drain jointing system of such versatile character that seal rings of standard diameter can, with the simple addition of an extra resilient ring, be made to fit a drain pipe differing substantially in exterior dimension from the standard.

With these and other objects in view, the invention consists in the construction, arrangement, and combination of the various parts of the device, whereby the objects contemplated are attained, as hereinafter set forth, pointed out in the appended claims and illustrated in the accompanying drawings.

In the drawings:

FIG. 1 is a longitudinal sectional view of a typical installation of the drain jointing system.

FIG. 2 is an exploded perspective view of the sealing rings which are made use of.

FIG. 3 is a cross sectional view through the composite seal ring.

FIG. 4 is a fragmentary cross sectional view similar to FIG. 3 but where an additional ring is provided for fitting the seal ring to a drain pipe of smaller diameter.

In an embodiment of the invention chosen for the purpose of illustration, there is shown a drain pan 10 which may be the drain pan of a shower, tub or similar installation where water is to be drained off. The drain pan is provided with a drain hole 11 around which is a sunken recess 12. A conventional drain pipe 13, frequently as a practical matter consisting of a 2-inch drain pipe, has an outside circumference 14 which although supposedly uniform in diameter, at times varies appreciably from the nominal outside diameter.

An upper end 15 of the drain pipe is usually cut so that it is located slightly below the recess 12 of the drain pan 10. A conventional grille 16 covers the drain hole and is provided with openings 17 through which the water passes to the interior of the drain pipe 13. A flange 18 on the grille is adapted to fit in a recess 19 of a tapered rim 20 on a fitting indicated generally by the reference character 21. The tapered rim 20 is of such size and dimension that it fits neatly within the recess 12 such that upper surfaces are flush with the surface of the pan 10.

To secure the fitting 21 to the pan 10, threads 22 are provided on the exterior of the wall 23 of the fitting. The threads accommodate a seal nut 24 which when threaded into position is adapted to engage a washer 25 which bears against a packing ring 26 by means of which a seal is made for the exterior of the fitting relative to the pan.

As is discernible in FIG. 1, the wall 23 of the fitting 21 is substantially larger in inside diameter than the outside diameter of the pipe 13 whereby to provide an annular cylindrical pocket 30. An inwardly directed rim 31 on the fitting 21 forms a bottom for the pocket.

Of the three seals made use of in making up the drain jointing system and as shown in FIG. 2, a first stabilizing ring 32 is made as a split ring whereas a second stabilizing ring 33 is continuous. The split ring is advantageously made in that fashion so that should there be a variation in the outside diameter of the drain pipe 13, the split ring 32, being the ring used at the bottom of the pocket 30, can be readily slid into position. The split ring 32 and circumferentially continuous ring 33, serving as stablizing rings, are made of relatively firm synthetic plastic resin material. Although the ring 33 is circumferentially continuous and does of necessity have to fit over the outside diameter of the drain pipe 13 which may vary in size, by reason of the fact that the ring 33 need not be pushed very far into the pocket 30, this can be accomplished even though the fit may be other than a comfortable sliding fit.

A seal ring indicated by the reference character 34 is composite initially its construction and consists of an outer wall section 35 and an inner wall section 36 joined together at one end of each by a bottom wall section 37. Adjacent inner surfaces 38 and 39 respectively of the outer wall section 35 and inner wall section 36 are initially spaced from each other as shown in FIG. 3 forming what may be described as a V-shaped space, in cross section. Extending inwardly from the outer wall section 35 is a bead 40 which is at a location near the outer or free end of the outer wall section, and initially clear of the opposite inner wall section.

By reason of this biased relationship of the inner and outer wall sections, a free end 41 of the inner wall section is substantially smaller in diameter than the outside diameter of the smallest of the drain pipes 13 which may be encountered.

When the drain jointing system is to be made up following the fastening of the fitting 21 to the pan 10 at a location around the drain pipe 13, the rings are inserted into the pocket 30 one at a time. It has been found advantageous in making up the jointing system to lubricate the rings with some available lubricant such as petroleum jelly, silicone or graphite grease, mineral oil or the like so that they can be slid readily into the pocket.

The split ring by reason of its character adjusts itself readily to whatever the dimension may be. When the seal ring is pushed into the pocket, the inner wall section 33 presses snugly against the outside surface of the drain pipe 13 and is pushed outwardly away from the pipe and toward the outer wall section 35, until the sections occupy substantially the relative position as shown in FIG. 1. This action has the effect of pressing the inner surface 39 of the inner wall section 36 firmly against the most nearly adjacent portion of the bead 40, the bead 40 therefore assisting in adding to the firmness of contact between the inner wall section 36 and especially its free end 41 with the drain pipe.

Following insertion of the seal ring 34 into the pocket, the circumferentially continuous stabilizer ring 33 is then pushed into position overlying the upper end of the seal ring. It is preferable to have the three rings stacked to a dimension such that when all three rings are in position in the pocket 30, the uppermost surface of the ring 33 will lie below the top end 15 of the drain pipe 13.

This having been accomplished, the grille 16 can then be placed in the position shown, with pressure being applied, so that legs 42 are pushed down slightly on the stack of rings whereby to urge them snugly together in the position shown in FIG. 1. If preferred, buttons 43 may be provided on the legs 42 in order to make a friction fit of the grille when it is pushed into place so that it will remain in place until pried loose with some suitable conventional tool.

To dismantle the drain jointing system, no more is necessary than to remove the grille 16, then unscrew the seal nut 24 so that the fitting 21 can be pushed upwardly. By such upward pushing, the rings can be dislodged from the pocket 30 and the joint accordingly be unmade without mutilating any of the parts or without disturbing them in any fashion which might prevent their being reapplied to make up a dependable joint.

For those occasions where the outside diameter of the drain pipe 13 may be smaller than usual, an O-ring 45 may be inserted into the space between the outer and inner wall sections 35 and 36 as shown in FIG. 4. This has the effect of pushing the free end 41 of the inner wall section 36 slightly further inwardly and also backing up the inner wall section 36 with the mass of the O-ring so that a snug surface-to-surface seal will be made even though the drain pipe 13 may be of slightly smaller outside diameter. This is important in making it unnecessary to inventory a variety of different sizes of seal rings for nominally standard drain pipes.

The consistency of the seal ring 34 is resilient throughout both the outer and inner walls sections 35 and 36, the seal ring having what may be described as a character of firm flexibility. One or another of the available synthetic plastic resin materials may be employed such as, for example, Neoprene.

While the invention has herein been shown and described in what is conceived to be a practical and effective embodiment, it is recognized that departures may be made therefrom within the scope of the invention, which is not to be limited to the details disclosed herein but is to be accorded the full scope of the claims so as to embrace any and all equivalent devices.

Having described the invention, what is claimed as new in support of Letters Patent is:

1. A sealing joint assembly for joining a drain pan with a drain pipe through a drain hole in said pan and comprising a fitting having an inside wall larger in diameter of the outside of the drain pipe whereby with the fitting in place forming an annular cylindrical pocket between said inside wall and the outside of the drain pipe and said fitting having an annular radially inwardly extending rim at one end of the fitting forming a bottom for said pocket, the improvement comprising, a first ring of synthetic plastic resin material at the bottom of said pocket, said first ring having a substantially solid cross sectional form, a seal ring of synthetic plastic resin material of resilient consistency in said pocket at a location above said first ring and a second ring of synthetic plastic resin material in said pocket at a location above the seal ring, said second ring having a substantially solid cross sectional form, said seal ring comprising spaced inner and outer wall sections and a bottom wall joining said inner and outer wall sections, said inner wall section being in initial position tilted diametrically inwardly away from the outer wall section to a position wherein the innermost portion of said inner wall section initially has a diameter smaller than the diameter of the outside of said drain pipe, and an annular bead on one of said wall sections at a location facing the other wall section having when assembled a relatively narrow annular line of engagement with said other wall section whereby to increase the sealing effect between said inner wall section and said drain pipe.

2. A sealed joint as in claim 1 wherein the first ring is circumferentially split.

3. A sealed joint as in claim 1 wherein the second ring is a circumferentially continuous ring.

4. A sealed joint as in claim 1 wherein the annular bead is located in the outer wall section adjacent the free end thereof.

5. A sealed joint as in claim 1 wherein the wall sections of the seal ring form a recess having a closed and an open end and there is a separate annular O-ring between the wall sections of the seal ring at a location between said bead and said closed end.

* * * * *